US007388517B2

(12) United States Patent
Kavaler

(10) Patent No.: US 7,388,517 B2
(45) Date of Patent: *Jun. 17, 2008

(54) METHOD AND APPARATUS FOR SELF-POWERED VEHICULAR SENSOR NODE USING MAGNETIC SENSOR AND RADIO TRANSCEIVER

(75) Inventor: Robert Kavaler, Kensington, CA (US)

(73) Assignee: Sensys Networks, Inc., Berkeley, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 11/062,130

(22) Filed: Feb. 19, 2005

(65) Prior Publication Data

US 2005/0190077 A1 Sep. 1, 2005

Related U.S. Application Data

(60) Provisional application No. 60/630,366, filed on Nov. 22, 2004, provisional application No. 60/549,260, filed on Mar. 1, 2004.

(51) Int. Cl.
*G08G 1/01* (2006.01)
*B60Q 1/00* (2006.01)

(52) U.S. Cl. ....................... 340/941; 340/928; 340/933

(58) Field of Classification Search ................ 340/941, 340/933, 928
See application file for complete search history.

(56) References Cited

U.S. PATENT DOCUMENTS 4,472,706 A * 9/1984 Hodge et al. ............... 340/941
5,247,297 A * 9/1993 Seabury et al. ............. 340/941
5,491,475 A 2/1996 Rouse et al.
5,748,108 A 5/1998 Sampey et al.
5,877,705 A 3/1999 Sampey
5,880,682 A 3/1999 Soiuillard et al.
6,029,092 A * 2/2000 Stein .......................... 700/11
6,208,268 B1 3/2001 Scarzello et al.
6,662,099 B2 12/2003 Knaian et al.
2002/0177942 A1 11/2002 Knaian et al.
2006/0202863 A1* 9/2006 Kavaler ...................... 340/941

OTHER PUBLICATIONS

D.E. Culler etal, "Wireless Sensor Networks: Introduction" Comm. of A.C.M., Jun. 2004, pp. 30-33.

R. Szewczyk etal, "Habitat monitoring with Sensor Networks", Comm. of A.C.M., Jun. 2004, pp. 34-40.

(Continued)

*Primary Examiner*—Donnie L Crosland
(74) *Attorney, Agent, or Firm*—Earle Jennings

(57) ABSTRACT

Vehicular sensor node, circuit apparatus and their operations are provided. Power from a power source is controlled for delivery to radio transceiver and magnetic sensor, based upon a task trigger and task identifier. The radio transceiver and the magnetic sensor are operated based upon the task identifier, when the task trigger is active. The power source, radio transceiver, magnetic sensor, and circuit apparatus are enclosed in vehicular sensor node, placed upon pavement and operating for at least five years without replacing the power source components. Magnetic sensor preferably uses the magnetic resistive effect to create magnetic sensor state. Radio transceiver preferably implements version of a wireless communications protocol. The circuit apparatus may further include light emitting structure to visibly communicate during installation and/or testing, and second light emitting structure used to visibly communicate with vehicle operators. Making filled shell and vehicular sensor node from circuit apparatus.

39 Claims, 8 Drawing Sheets

OTHER PUBLICATIONS

J. Hill, "The platforms enabling wireless sensor networks", Comm. of A.C.M., Jun. 2004, pp. 41-46.

A. Woo etal, "Netowkring support for query processing in sensor networks", Comm. of A.C.M., Jun. 2004, pp. 47-52.

A. Perrig etal, "Security in wireless sensor networks", Comm. of A.C.M., Jun. 2004, pp. 53-57.

Honeywell, "1, 2, and 3 Axis Magnetic Sensors", Honeywell product datasheet, versions available at least 2004, pp. 1-12.

M. Caruso etal, "Vehicle detection & Compass Applications using AMR Magnetic Sensors", Honeywell, since 2004, pp. 1-13.

B. Pant etal, "Magnetic Sensor Cross-Axis Effect", Honeywell App Note AN-205, since 2004, pp. 1-6.

Honeywell, "Vehicle detection using AMR sensors" Honeywell App Note AN-218, since 2004, pp. 1-10.

* cited by examiner

METHOD AND APPARATUS FOR SELF-POWERED VEHICULAR SENSOR NODE USING MAGNETIC SENSOR AND RADIO TRANSCEIVER

CROSS REFERENCES TO RELATED PATENT APPLICATIONS

This application claims priority to Provisional Patent Application Ser. No. 60/549,260, filed Mar. 1, 2004 and Provisional Patent Application Ser. No. 60/630,366, filed Nov. 22, 2004, both of which are incorporated herein by reference.

TECHNICAL FIELD

This invention relates to motor vehicle detection modules, in particular, to self-powered vehicular sensors supporting magnetic sensors in communication with a wireless sensor network, for placement upon pavement.

BACKGROUND OF THE INVENTION

Today, there are vehicular sensor nodes using a magnetic sensor based upon a buried inductive loop in the pavement These prior art vehicular sensor nodes have several problems. First, to install them, the pavement must be torn up and the inductive coil buried. This installation process is not only expensive, but the quality of installation depends upon the proficiency of the installer. What is needed is a vehicular sensor node that is reliable and inexpensive to install without requiring a lot of training and/or experience.

Today, magnetic sensors, in particular magneto-resistive sensors, exist which can be used to sense the presence, and sometimes the direction, of a vehicle passing near them. Some significant elements of their use and installation are missing in the prior art. By way of example, how to mechanically package these sensors so they can be mounted on pavement and internally powered. Also, how to provide them an interface to traffic monitoring networks which can be pavement mounted and internally powered. And how to install the packaged sensors in a cost effective, reliable manner.

Today, there exist hard plastic shells which have been proven to withstand road use on pavement, but which have never been used for vehicular sensor nodes. These plastic shells have been used for road level traffic signals and traffic direction indicators, and are usually powered by an inductive coupling between a buried cable and an inductive power coupling to the electronics inside the plastic shell.

Today, there are many parking facilities and controlled traffic regions where knowing the availability of parking spaces on a given floor or region would be an advantage, but costs too much to implement. An inexpensive way to determine parking space availability is needed in such circumstances.

Today, many parking facilities and controlled traffic regions must identify and log vehicles upon entry and exit. This process is expensive, often requiring personnel. What is needed is an inexpensive mechanism providing this service. What is needed is a low cost, reliable mechanism for monitoring entry and exit from these facilities and regions.

Today, many traffic authorities use a radar based velocity detection approach to apprehend motorists driving vehicles at illegal speeds. These radar based systems are relatively inexpensive, but are detectable by motorists who equip their vehicles with radar detection devices. Consequently, these motorists often avoid detection of their illegal activities. While alternative optical speed detection systems exist, they have proven very expensive to implement. What is needed is a low cost, reliable mechanism for vehicle velocity detection identifying the vehicle violating the traffic laws.

SUMMARY OF THE INVENTION

This invention relates to motor vehicle detection modules, in particular, to self-powered vehicular sensors supporting magnetic sensors in communication with a wireless sensor network, for placement upon pavement.

The invention includes a vehicular sensor node, which is inexpensive, efficient, and reliable. It operates as follows: a clock count is maintained to create a task trigger and a task identifier. Power from a power source is controlled for delivery to a radio transceiver and a magnetic sensor based upon the task trigger and the task identifier. The radio transceiver and the magnetic sensor are operated based upon the task identifier, when the task trigger is active. The power source, the radio transceiver, and the magnetic sensor are enclosed in the vehicular sensor node, which is placed upon pavement and operates for at least five years without replacing the power source.

The invention includes a circuit apparatus for the vehicular sensor node. It includes the following. Means for maintaining the clock count to create the task trigger and the task identifier. Means for controlling the power from the power source delivered to the radio transceiver and the magnetic sensor based upon the task trigger and the task identifier. And means for operating the radio transceiver and the magnetic sensor based upon the task identifier, when the task trigger is active.

The means for maintaining the clock count preferably is powered and runs most if not all the time, whereas the means for controlling and the means for operating are preferably powered only when a task is triggered. When the means for controlling and/or the means for operating are powered, they tend to consume much more power than the means for maintaining the clock count. The invention preferably minimizes power dissipation using this apparatus and its method of operation.

One or more computers, field programmable logic devices, and/or finite state machines may be included to implement these means. Preferably, the means for controlling the power may minimize delivery of power to all circuitry when the task trigger is inactive, or the task identifier does not indicate the need for the circuitry, where the circuitry includes the radio transceiver, the magnetic sensor, the computer, as well as other circuits, such as memory. The power consumption of the minimized circuitry may preferably be less than 100 nano-watts (nw), further preferably less than 10 nw. The means for maintaining the clock count may be powered most of the time. The means for maintaining may couple with a clock crystal. The clock crystal may preferably operate at approximately 32K Herz (Hz), where 1K is 1024.

At least two of the means for maintaining, the means for controlling, and the means for operating may preferably be housed in a single integrated circuit. Preferably, all three means may be housed in the single integrated circuit. Also, the single integrated circuit may house the radio transceiver and/or the magnetic sensor. The circuit apparatus may include an antenna coupled with the radio transceiver. The antenna may preferably be a patent antenna.

The power source, may preferably include at least one battery, and may further preferably include at least one solar cell.

The magnetic sensor preferably uses a form of the magnetic resistive effect, and includes a more than one axis magneto-resistive sensor to create a magnetic sensor state. The magnetic sensor preferably includes a three axis magneto-resistive sensor.

The radio transceiver preferably implements a version of at least one wireless communications protocol, preferably the IEEE 802.15.4 communications standard. It uses at least one channel of the wireless communication protocol. It may use a second channel to communicate with a vehicle radio transceiver associated and/or attached to a vehicle.

The circuit apparatus may further include a light emitting structure, used to visibly communicate during installation and/or testing a vehicular sensor network. The circuit apparatus may also include a second light emitting structure used to communicate with vehicle operators and/or for pedestrians. In certain preferred embodiments, the previously discussed light emitting structure may implement the second light emitting structure. One important potential use is the indication of a traffic hazard.

The vehicular sensor may preferably be used in a vehicular sensor network providing traffic reports regarding parking space availability, logs of vehicular entry and exits, vehicular speeds, and photographs of license plates when needed.

The invention includes making a filled shell and the vehicular sensor node from the circuit apparatus, as well as the filled shell and the vehicular sensor node as products of that process.

DETAILED DESCRIPTION

Figure 1A:
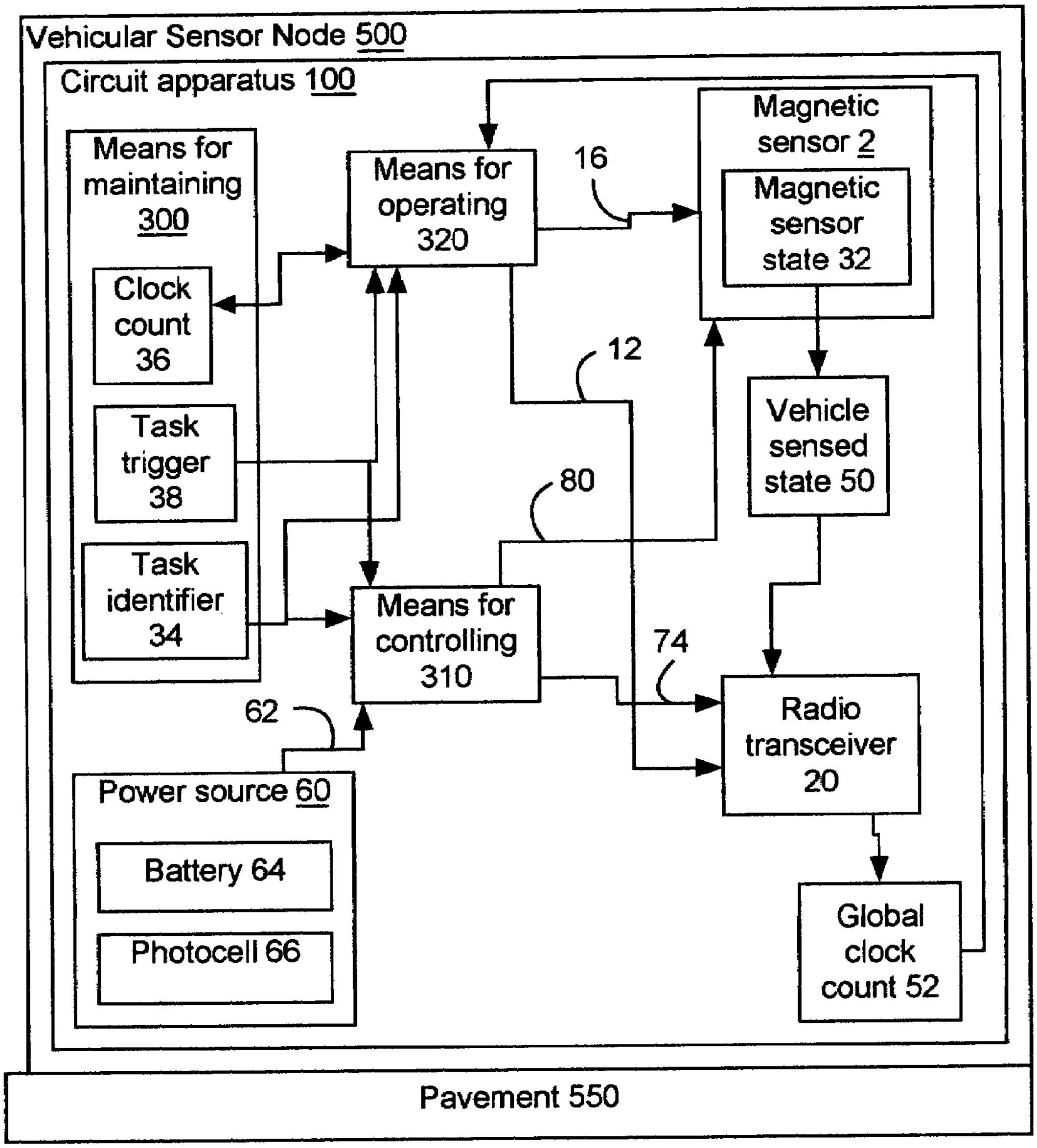
FIG. 1A shows an example of a vehicular sensor node enclosing a power source, radio transceiver, magnetic sensor, and a circuit apparatus placed upon pavement.

The invention includes a vehicular sensor node, which is inexpensive, efficient, and reliable. The invention operates as follows: a clock count is maintained to create a task trigger and a task identifier. The power from a power source is controlled for delivery to a radio transceiver and a magnetic sensor based upon the task trigger and the task identifier. The radio transceiver and the magnetic sensor are operated based upon the task identifier, when the task trigger is active. The power source, the radio transceiver, and the magnetic sensor are enclosed in the vehicular sensor node, which is placed upon the pavement and operates for at least five years, and preferably at least ten years, without replacement of the power source or its components.

The invention as shown FIG. 1A operates as follows: the clock count 36 is maintained to create the task trigger 38 and the task identifier 34. The power 62 from the power source 60 is controlled for delivery to the radio transceiver 20 and the magnetic sensor 2 based upon the task trigger and the task identifier. The radio transceiver and the magnetic sensor are operated based upon the task identifier, when the task trigger is active. The power source, the radio transceiver, and the magnetic sensor are enclosed in the vehicular sensor node 500, which is placed upon the pavement 550 and operates for at least five years, and preferably at least ten years, without replacement of the power source 60 or its components. The power source 60, may preferably include at least one battery 64, and may further preferably include at least one solar cell 66.

The invention includes a circuit apparatus 100 for enclosure in a vehicular sensor node 500 as shown in FIG. 1A. The circuit apparatus includes the following: Means for maintaining 300 the clock count 36 to create the task trigger 38 and the task identifier 34. Means for controlling 310 the power 62 from the power source 60 based upon the task trigger and the task identifier. The power is delivered, as the transceiver power 74, to the radio transceiver 20 and, as the sensor power 80, to the magnetic sensor 2. And means for operating 320 the radio transceiver and the magnetic sensor based upon the task identifier, when the task trigger is active.

Figure 2A:
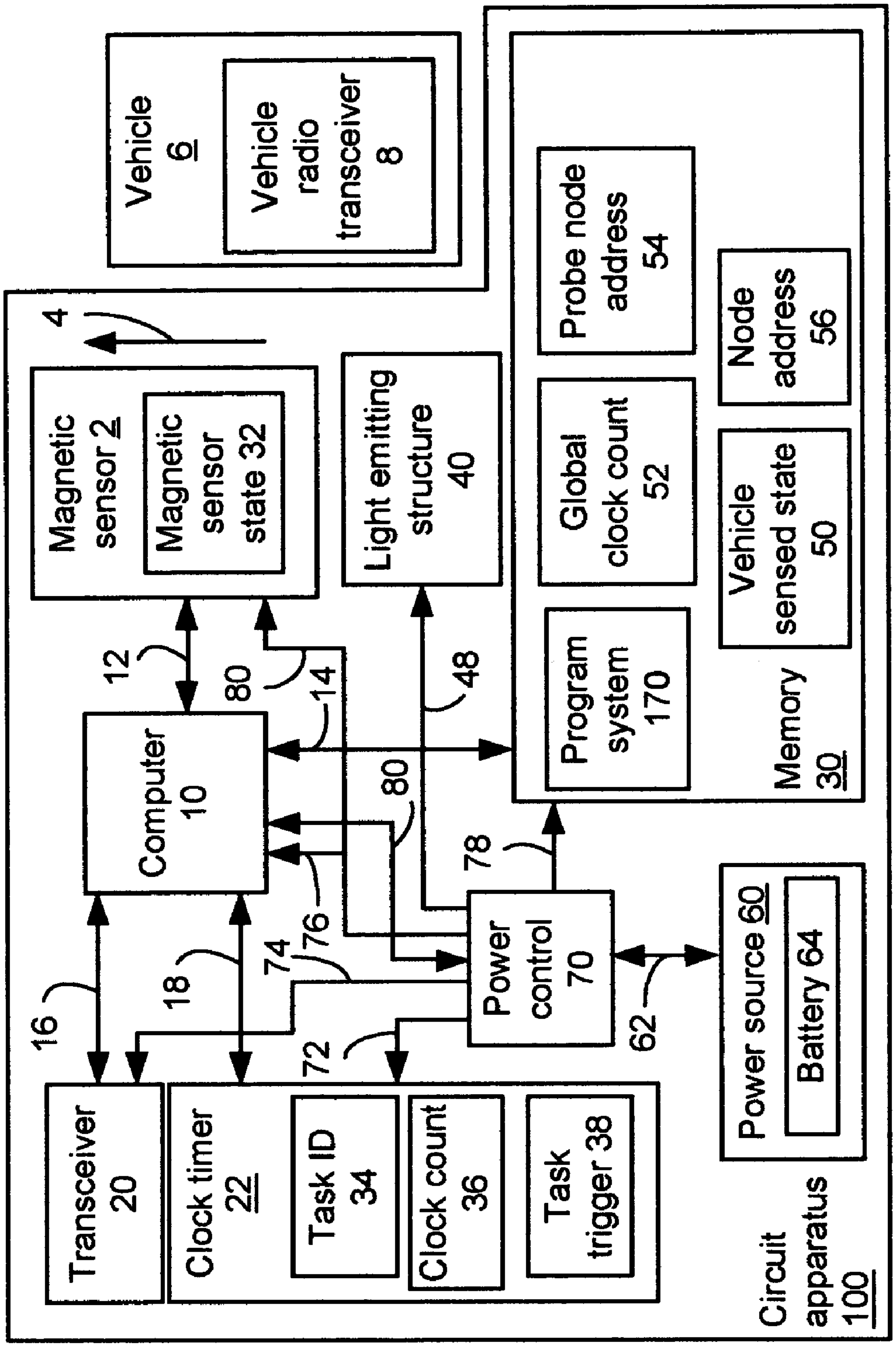
FIG. 2A shows an embodiment of the circuit apparatus of FIGS. 1A and 1B using a computer, where the circuit apparatus can sense the presence of a vehicle.

The means for maintaining 300 may preferably include a clock timer 22 controllably coupled to the computer 10 to deliver the task trigger 38 and the task identifier 34, and communicatively coupled with the computer to communicate said clock count 36, as shown in FIG. 2A. The task trigger and task identifier are used to control the operation of the computer. The computer may preferably be a microprocessor, preferably a low power microprocessor, further an MSP430F149, manufactured by Texas Instruments, which includes the clock timer.

The invention preferably includes a method of using the power source 60 of FIGS. 1A and 2A to internally power the vehicular sensor node 500. The method includes the following: Minimizing the power 62 from the power source 60 delivered to the radio transceiver 20 and the magnetic sensor 2, when the task trigger 38 is inactive. And when the task trigger is active, distributing the power from the power source delivered to the radio transceiver and the magnetic sensor based upon the task identifier. Minimizing the power delivered to the radio transceiver and the magnetic sensor may preferably include delivering less than 100 nano-watts (nw) to one or both of them, further delivering less than 100 nw to each, and further delivering less than 10 nw to at least one of them.

Distributing the power 62 from the power source 60, preferably includes: Delivering the transceiver power 74 to the radio transceiver 20, when the task identifier 34 indicates that the radio transceiver is used. And delivering a sensor power 80 to the magnetic sensor 2, when the task identifier indicates the magnetic sensor is used. Delivering power to the radio transceiver and/or the magnetic sensor may preferably require starting to deliver power before performing the relevant operations with them.

The method of using the power source 60 of FIG. 2A may preferably further include: providing the first power 76 to a computer 10, when a task trigger 38 generated by the clock timer 22 is asserted, the first power 76 is set to operate the computer 10. It may be further preferred that when a power-down command is asserted in the task identifier 34, the first power 76 is set to standby mode for the computer 10. The method may preferably further include providing a constant power 72 to the clock timer.

The magnetic sensor 2 of FIGS. 1A to 2A, preferably uses a form of the magnetic resistive effect. The magnetic sensor preferably includes a more than one axis magneto-resistive sensor to create a magnetic sensor state. In particular, the magnetic sensor includes a two axis magneto-resistive sensor. The magnetic sensor may preferably include one of the two axis magneto-resistive sensors manufactured by Honeywell. The magnetic sensor 2 may include a three axis magneto-resistive sensor. The magnetic sensor state 32 may be received through an instrumentation amplifier, preferably an INA118 instrumentation amplifier manufactured by Texas Instruments to create an amplified magnetic sensor state, which is preferably received by an Analog to Digital Converter to create the vehicle sensed state 50.

The magnetic sensor 2 has a primary sensing axis 4 for sensing the presence of a vehicle 6. Preferably, the magnetic sensor 2 may be first communicatively coupled 12 with a computer 10 and the magnetic sensor provides a magnetic sensor state 32 to the computer.

The radio transceiver 20 preferably implements a version of at least one wireless communications protocol, preferably the IEEE 802.15.4 communications standard. The wireless communications protocol may further preferably be the IEEE 802.15.4 communications standard. The radio transceiver uses at least one channel of the wireless communication protocol. It may use a second channel to communicate with a vehicle radio transceiver 8 associated and/or attached to the vehicle 6. The radio transceiver is preferably a CC2420 transmitter and receiver manufactured by ChipCon.

The radio transceiver 20 may include a receiver and a transmitter. Operating the radio transceiver often refers to operating exactly one of either the receiver or the transmitter. It may be preferred that when the receiver is being operated, power delivery to the transmitter is minimized. Similarly, when the transmitter is operated, power delivery to the receiver is minimized.

Figure 2B:
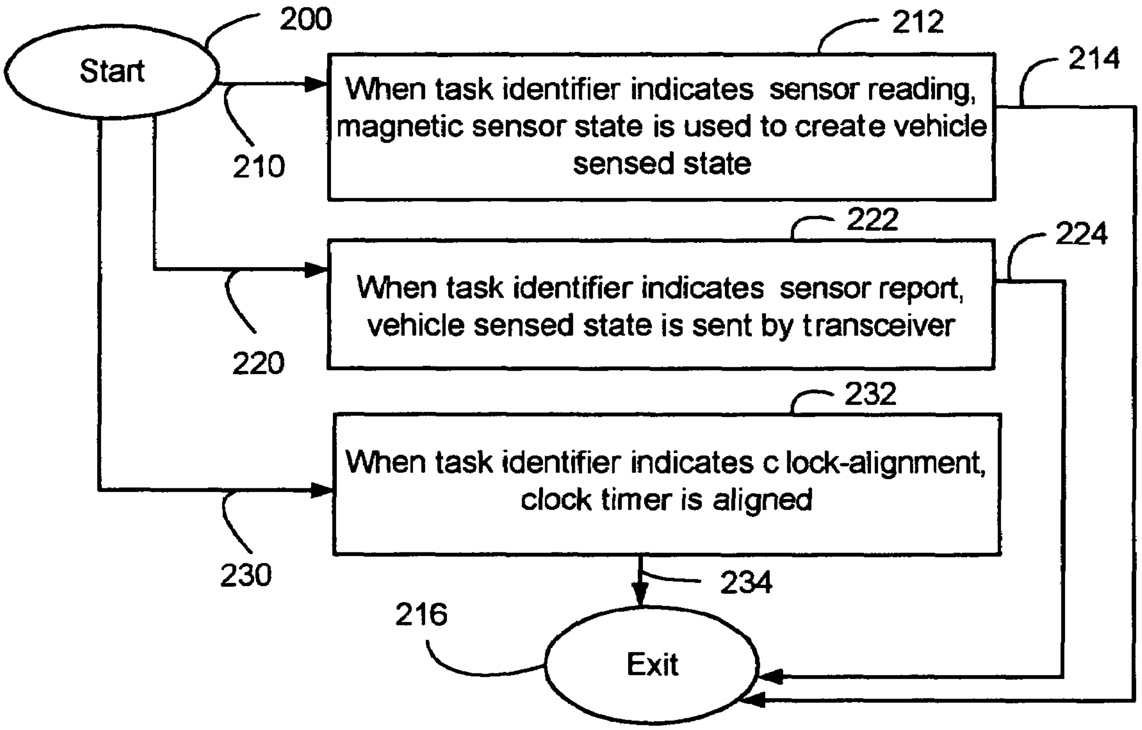
FIG. 2B shows an example of the program system of FIG. 2A, operating the magnetic sensor and the radio transceiver.

The means for operating 320 may preferably include the computer 10 controllably coupled 80 to the power circuit 70, controllably coupled 16 to the radio transceiver 20, and controllably coupled 12 to the magnetic sensor 2; and the computer accessibly coupled 14 with a memory 30 containing a program system 200, including the program steps of: operating said radio transceiver and said magnetic sensor based upon said task identifier 34, when said task trigger 38 is active, as shown in FIG. 2B. The program system may also, preferably include controlling power from the power source delivered to the radio transceiver and the magnetic sensor based upon the task trigger and the task identifier.

Preferably, the computer 10 may also be second communicatively coupled 16 with the radio transceiver 20, as shown in FIG. 2A.

Figure 1B:
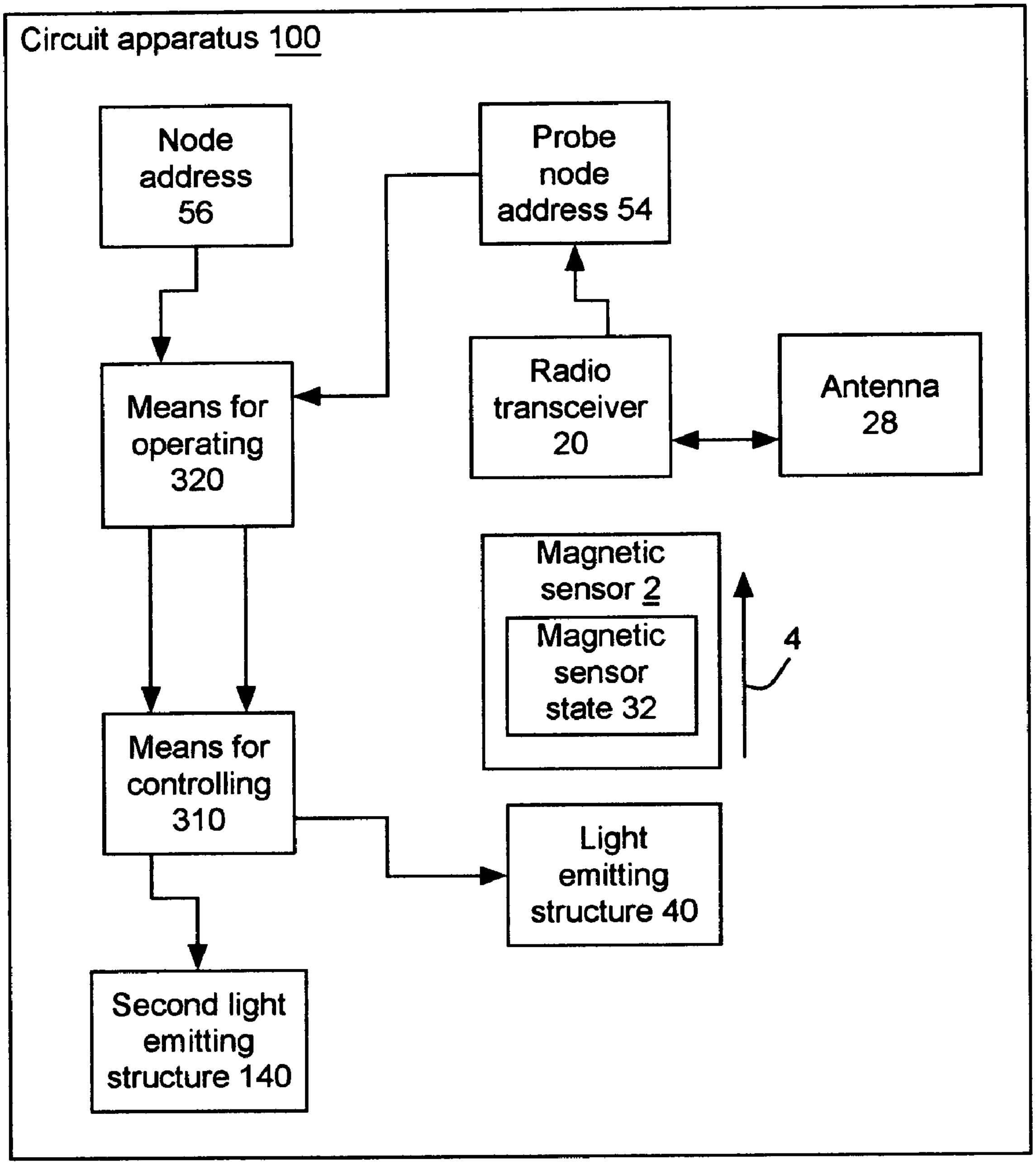
FIG. 1B shows a refinement of the circuit apparatus of FIG. 1B including light emitting structures and an antenna.

The circuit apparatus 100 may preferably include a light emitting structure 40, as shown in FIGS. 1B and 2A. The magnetic sensor 2 preferably has a primary sensing axis 4 for sensing the presence of the vehicle 6, that is used to create the magnetic sensor state 32. The light emitting structure is preferably used to visibly communicate during installation and/or testing a vehicular sensor network containing the circuit apparatus in a vehicular sensor node 500.

The circuit apparatus 100 may further include the following. The computer 10 may be controllably coupled 80 with the power control 70 as shown in FIG. 2A. The power control may deliver a first lighting power 48 to the light emitting structure 40.

Operating the vehicular sensor node 500 and/or the circuit apparatus 100 may preferably include using the light emitting structure 40 to visibly communicate, when the task identifier 34 indicates a feedback task. Using the light emitting structure 40 to visibly communicate preferably includes: receiving from the radio transceiver 20 a probe node address 54, and visibly communicating using the probe node address 54. The circuit apparatus, preferably further includes a node address 56. Visibly communicating using the probe node address further includes: visibly communicating when the node address equals the probe node address.

Alternatively, visibly communicating using the probe node address 54 may further include at least one the following: Visibly communicating when the node address 56 does not equal the probe node address. Visibly communicating when the node address is less than the probe node address. And visibly communicating when the node address is greater than the probe node address.

The circuit apparatus 100 may preferably include a second light emitting structure 140, as shown in FIG. 1B, which may preferably be used to communicate with vehicle operators and/or for pedestrians. Visibly communicating with vehicle operators is preferably supported by the second lighting structure being parallel to the primary sensing axis 4 of the magnetic sensor 2. Visibly communicating for pedestrians means communicating with the vehicle operators the intention of the pedestrian, for example, to cross a street.

An example of a preferred circuit apparatus 100 is shown in FIG. 2A, including a computer 10 accessibly coupled 14 to a memory 30 to execute program steps included in a program system 200. The program system may support the means for operating 320 of FIGS. 1A and 1B, as shown in FIGS. 2B to 3B. In other embodiments, the program system may further support the means for controlling 310.

At least two of the means for maintaining 300, the means for controlling 310, and the means for operating 320 may preferably be housed in a single integrated circuit. Preferably, all three means may be housed in the single integrated circuit. Also, the single integrated circuit may house the radio transceiver 20 and/or the magnetic sensor 2. The circuit apparatus 100 may include an antenna 28 coupled 26 with the radio transceiver. The antenna may preferably be a patch antenna. In certain preferred embodiments, the computer 10 and the clock timer 22 may be housed in a single integrated circuit.

Some of the following figures show flowcharts of at least one method of the invention, which may include arrows with reference numbers. These arrows signify a flow of control, and sometimes data, supporting various implementations of the method. These include at least one the following: a program operation, or program thread, executing upon a computer; an inferential link in an inferential engine; a state transition in a finite state machine; and/or a dominant learned response within a neural network.

The operation of starting a flowchart refers to at least one of the following. Entering a subroutine or a macro instruction sequence in a computer. Entering into a deeper node of an inferential graph. Directing a state transition in a finite state machine, possibly while pushing a return state. And triggering a collection of neurons in a neural network. The operation of starting a flowchart is denoted by an oval with the word "Start" in it.

The operation of termination in a flowchart refers to at least one or more of the following. The completion of those operations, which may result in a subroutine return, traversal of a higher node in an inferential graph, popping of a previously stored state in a finite state machine, return to dormancy of the firing neurons of the neural network. The operation of terminating a flowchart is denoted by an oval with the word "Exit" in it.

A computer as used herein will include, but is not limited to, an instruction processor. The instruction processor includes at least one instruction processing element and at least one data processing element. Each data processing element is controlled by at least one instruction processing element.

The program system 200 of FIG. 2A includes the program steps shown in FIG. 2B: Operation 212 supports when the task identifier 34 indicates a sensor reading, the magnetic sensor state 32 is used to create a vehicle sensed state 50. Operation 222 supports when the task identifier indicates a sensor report, the vehicle sensed state is sent by the radio transceiver 20. Operation 232 supports when the task identifier indicates a clock-alignment, the clock timer 22 is aligned.

Figure 3A:
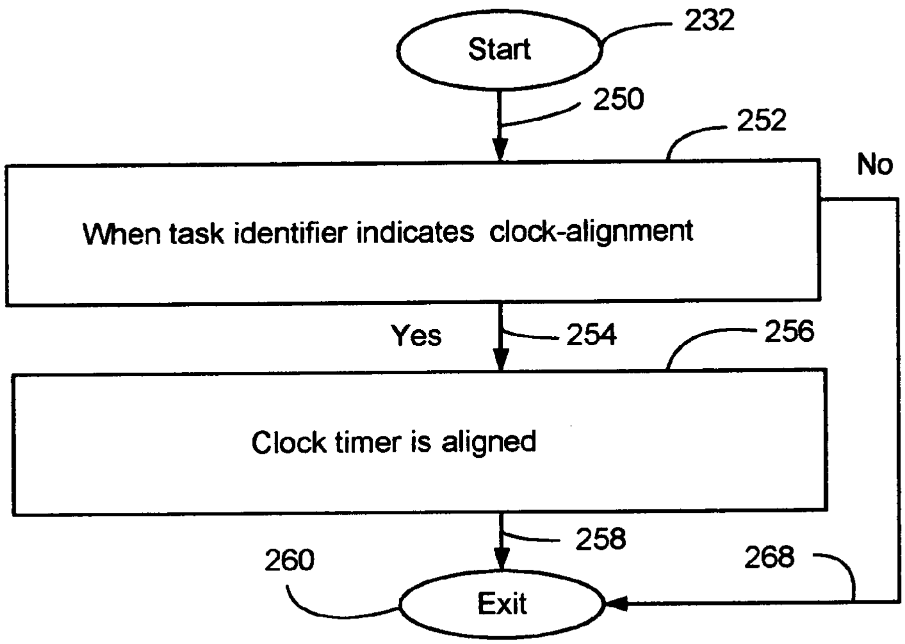
FIGS. 3A and 3B show some example details of the operation of clock-alignment of FIG. 2B.
Figure 3B:
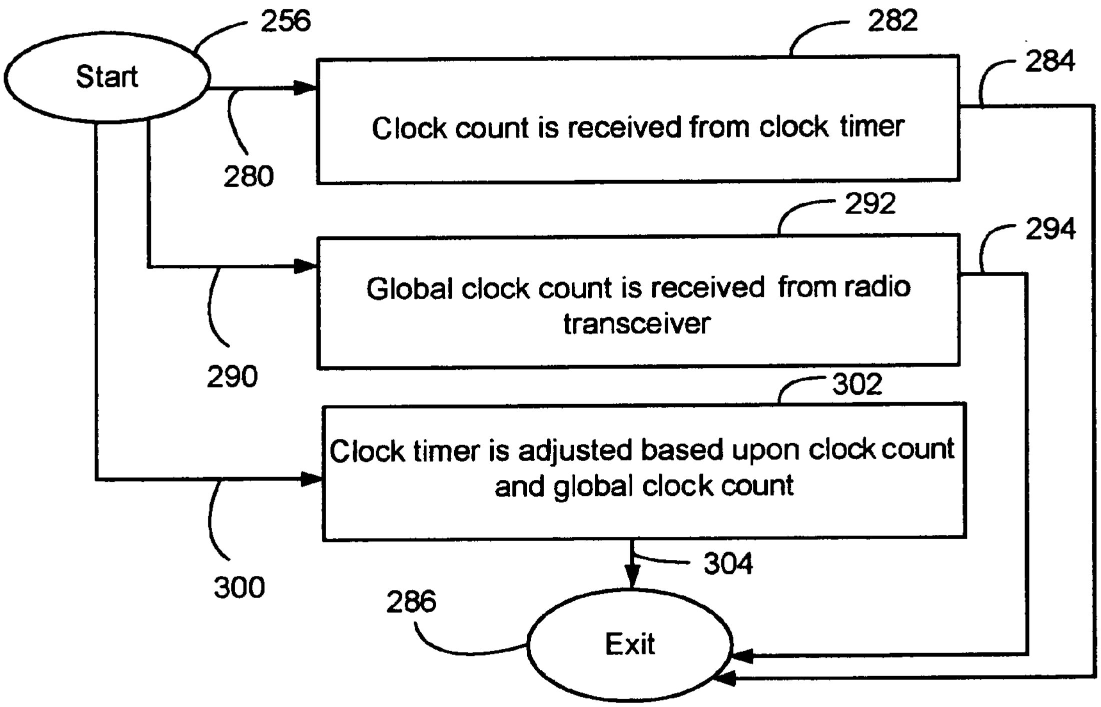

Operation 232 of FIG. 2B, may further support aligning the clock timer 22 with the operations of FIG. 3A and FIG. 3B: The clock count 36 is received from the clock timer, the global clock count 52 is received from the radio transceiver 20, and the clock timer is adjusted based upon the clock count and the global clock count.

Figure 4:
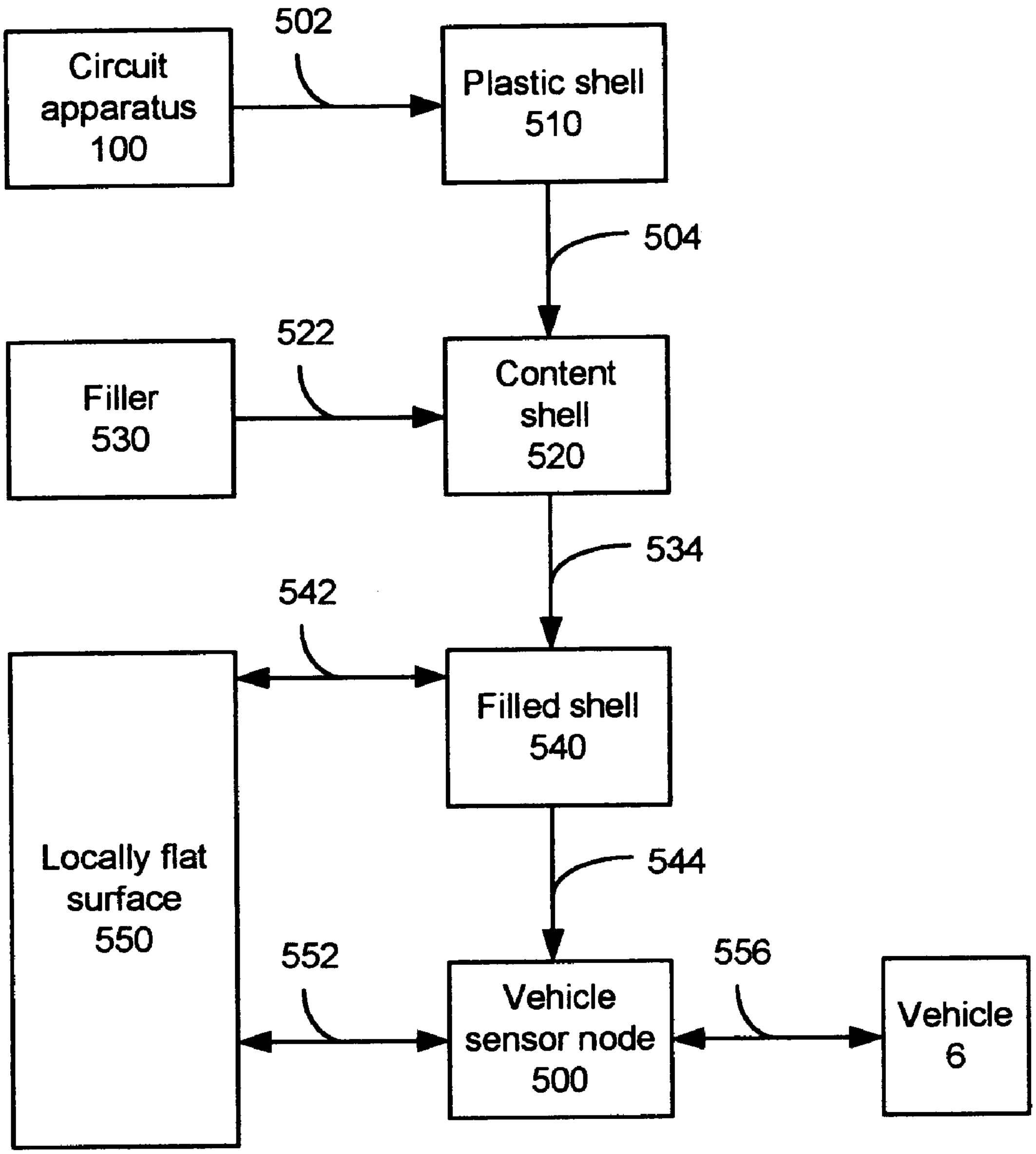
FIG. 4 shows making of the vehicular sensor node from the circuit apparatus, attaching it to a locally flat surface, preferably pavement.

Making the vehicular sensor node 500 from the circuit apparatus 100 and from a plastic shell 510 as shown in FIG. 4, includes the following steps: Inserting 502 the circuit apparatus into the plastic shell to content-create 504 a content shell 520. Filling 522 the content shell with a filler 530 to fill-create 534 a filled shell 540. Gluing 542 the filled shell to a locally flat surface 550 to glue-create 544 the vehicular sensor node with a glued bond 552 to the locally flat surface. In many situations, the locally flat surface is the pavement of FIG. 1A, however one skilled in the art will recognize that locally flat surfaces may include, but are not limited to, a pavement, a ramp, a wall, a ceiling, a traffic barrier, and a fence, by way of example.

One skilled in the art will also recognize that the steps of inserting 502 and filling 522 may be reversed in making the filled shell 540. These steps will be referred to hereafter as enclosing the circuit apparatus 100 in the plastic shell 510 filled with the filler 530 to create the filled shell.

The plastic shell 510 may resiliently deform while preserving the glued bond 552 when the vehicle 6 rests 556 on the plastic shell 510. The vehicle may further rest on the plastic shell for more than a day, an hour, a minute, and/or a second.

The plastic shell 510 preferably includes a polycarbonate compound, preferably a high impact polycarbonate compound. The plastic shell may further preferably be made from a Bayer high impact polycarbonate compound. The plastic shell may further preferably be a version of the SMARTSTUD™ plastic shell manufactured by Harding Systems as described at http:/www.hardingsystems.com/

The filler 530 preferably includes an elastomer, which further preferably includes a polyurethane elastomer. The gluing 542 preferably uses an adhesive, which preferably does not destructively interact with the plastic shell 510, and may further be manufactured by Harding Systems.

Figure 5A:
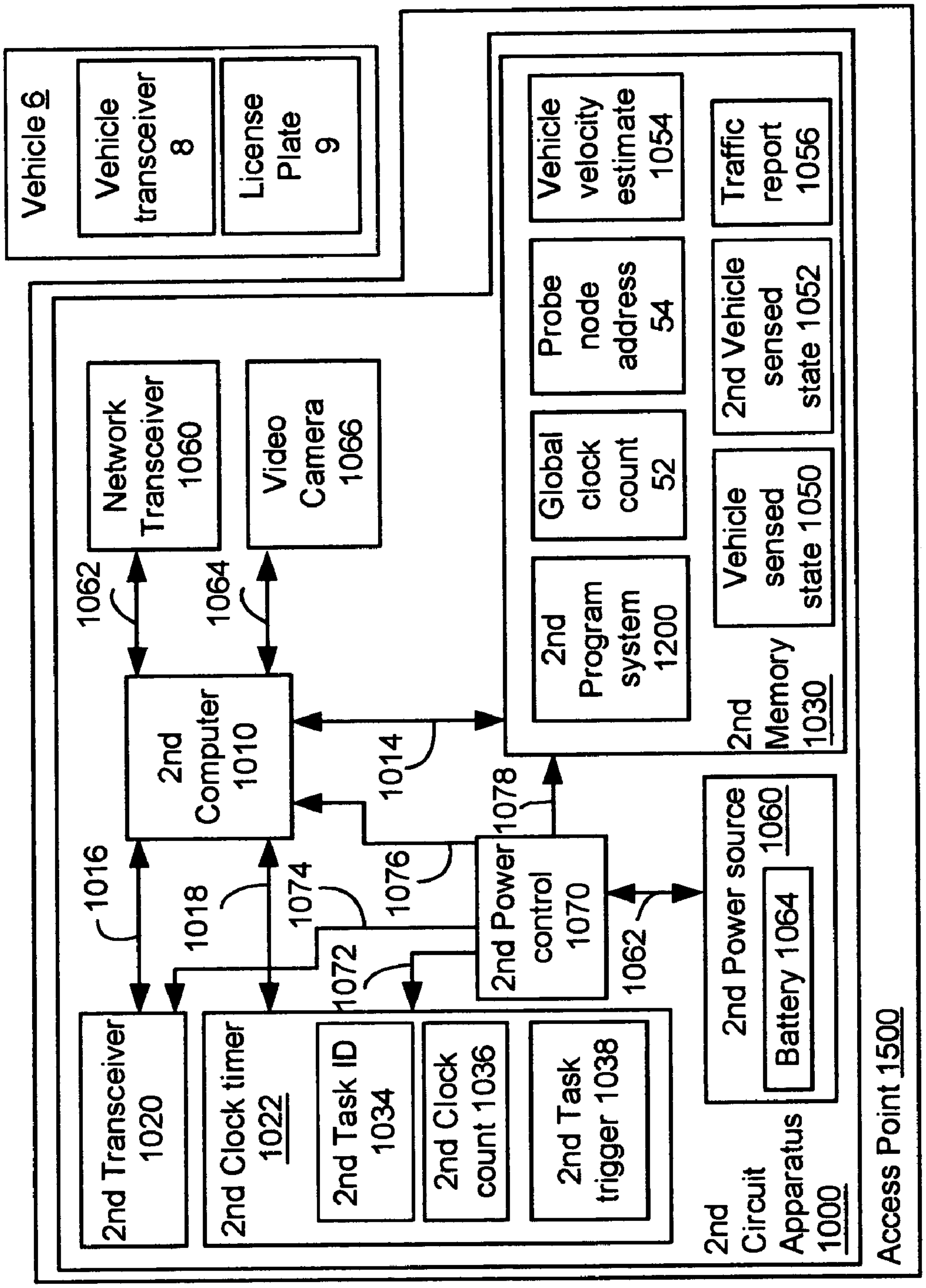
FIG. 5A shows an access point for communicating with at least one of the vehicular sensor nodes of the preceding Figures.
Figure 5B:
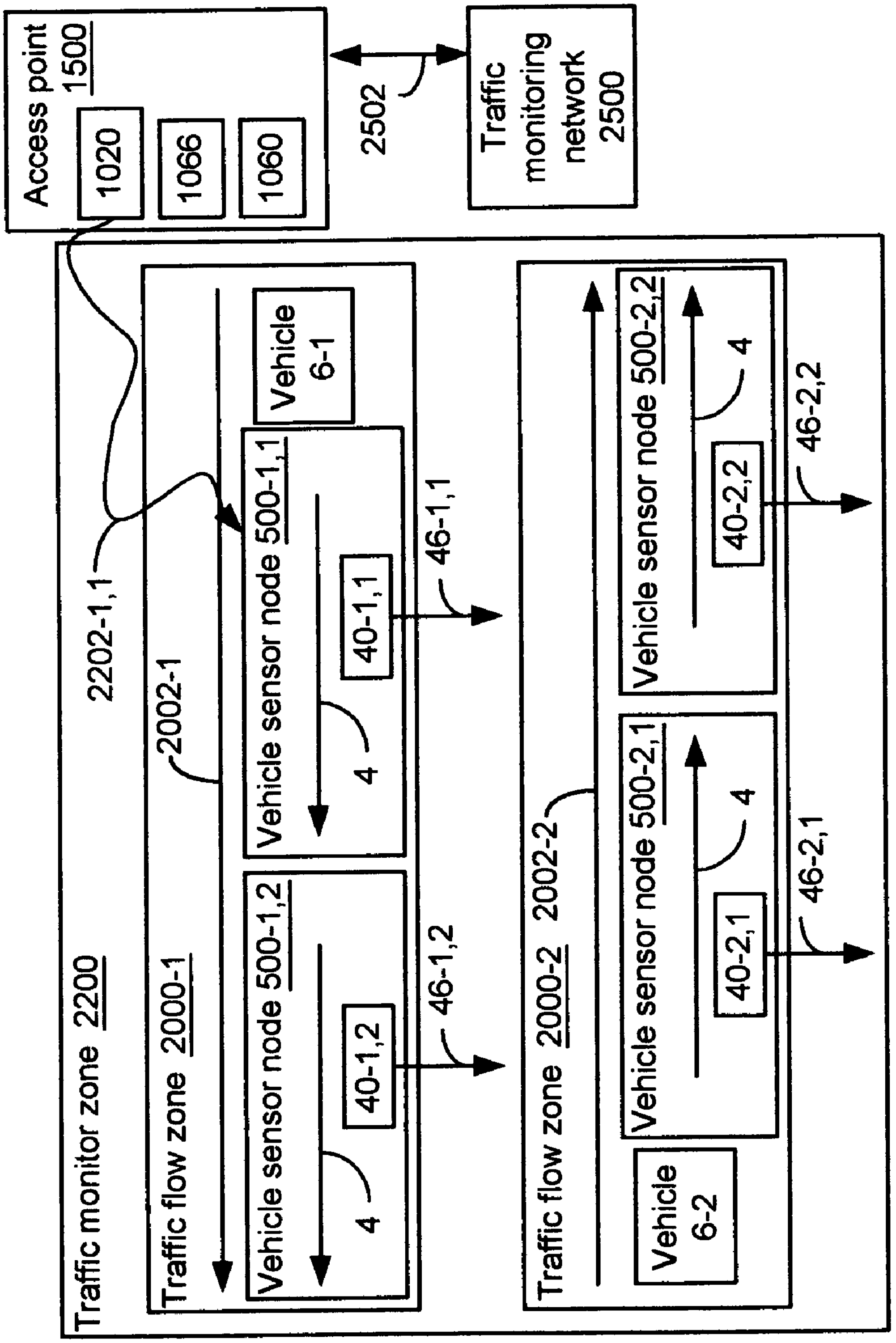
FIG. 5B shows a wireless vehicular sensor network using the access point and vehicular sensors shown in the preceding Figures.

The invention includes a second circuit apparatus 1000 for an access point 1500 for wireless communicating 2202 with at least one vehicular sensor node 500 as shown in FIG. 5B. The second circuit apparatus is shown in FIG. 5A preferably including the following: A second clock timer 1022 second providing 1018 a second task identifier 1034, a second clock count 1036, and a second task trigger 1038 to the second computer 1010. The second computer second-accesses 1014 a second memory 1030 to execute program steps included in a second program system 1200. The second computer is second-second communicatively coupled 1016 with a second radio transceiver 1020. The second computer is third-communicatively coupled 1062 to a network transceiver 1060 for a network-coupling 2502 to a traffic monitoring network 2500, as shown in FIG. 5B.

The multiple vehicle sensor nodes wirelessly communicating with the access point 1500 are preferably configured to form a time division multiple access network, in which no more than one vehicle sensor node sends information to the access point across one channel in one time slot. The access point may send information to more than one, and in certain situations, all the vehicle sensor nodes on one channel during one time slot. By way of example, the access point may send the global clock count to all vehicular sensor nodes at essentially the same time.

The operations of the access point 1500 may be implemented by the second program system 1200, which may preferably include the following. When the second task identifier 1034 indicates distribute clock alignment, the second clock count 1036 is used to create the global clock count 52, and the second radio transceiver 1020 sends the global clock count 52 to at least one vehicular sensor node 500. When the second task identifier indicates access sensor state of the vehicular sensor node, the second radio transceiver is used to receive the received vehicular sensor state 1050 from the vehicular sensor node. When the second task identifier indicates update the second received vehicular sensor state 1052, the second received vehicular sensor state is updated based upon at least the received vehicular sensor state. When the second task identifier indicates calculate a vehicle velocity estimate 1054, the vehicle velocity estimate is calculated based upon the received vehicular sensor state and a second received vehicular sensor state 1052. When the second task identifier indicates a traffic network update, a traffic report 1056 is generated based upon the received vehicular sensor state and the second received vehicular sensor state, and the traffic report is sent using the network transceiver 1060 across the network-coupling 2502 to the traffic monitoring network 2500.

Installing the vehicular sensor node 500, wireless communicating 2202 with an access point 1500, as shown in FIG. 5A, for a traffic monitoring zone 2200 as shown in FIG. 5B, preferably includes the following steps. Aligning the primary sensing axis 4 of the vehicular sensor node 500 with the primary traffic flow 2002 of at least one traffic flow zone 2000. And, testing the vehicular sensor node 500 using the light emitting structure 40 to visually communicate 46 perpendicular to the primary traffic flow 2002. The access point may preferably wirelessly communicate with more than one vehicular sensor node. It should be noted that the primary sensing axis is not the axis used most frequently used in sensing the presence of a vehicle, which is the vertical axis from the pavement and/or locally flat surface the vehicle sensor node is affixed to. The primary sensing axis is used to orient the vehicular sensor node to optimize the reliability of sensing the presence of a vehicle.

The traffic flow zone 2000 may include more than one primary traffic flow 2002, often indicating two-way traffic. The traffic monitoring zone 2200 may include more than one traffic flow zone. By way of example, FIG. 5B shows the following: The traffic monitoring zone includes a first traffic flow zone 2000-1 and a second traffic flow zone 2000-2.

The first traffic flow zone 2000-1 includes a first primary traffic flow 2002-1. A first-first vehicular sensor node 500-1,1 and a first-second vehicular sensor node 500-1,2 are installed in the first traffic flow zone. The primary sensing axis 4 of these vehicular sensor nodes are aligned with the first primary traffic flow.

The second traffic flow zone 2000-2 includes a second primary traffic flow 2002-2. A second-first vehicular sensor node 500-2,1 and a second-second vehicular sensor node 500-2,2 are installed in the second traffic flow zone. The primary sensing axis 4 of these vehicular sensor nodes are aligned with the second primary traffic flow.

When a first vehicle 6-1 travels in the first primary traffic flow 2002-1 of the first traffic flow zone 2000-1, the following operations are performed by the first-first vehicular sensor node 500-1,1 and the first-second vehicular sensor node 500-1,2 installed in the first traffic flow zone. Both of the vehicular sensor nodes are time synchronized by the access point 1500 to within a fraction of a second, in particular, to fraction of a millisecond. The magnetic sensor state 32 of each vehicular sensor node is used to create a vehicle sensed state 50 within that vehicular sensor node. Both vehicular sensor nodes send their vehicle sensed state to at least partly create the received vehicular sensor state.

It is often preferred that the received vehicular sensor state 1050 includes a time synchronized sensor state for each magnetic sensor in the vehicular sensor nodes for the same traffic flow zone. One preferred method of determining a vehicle velocity estimate 1054 includes using at least two vehicle sensor nodes, such as the first-first vehicular sensor node 500-1,1 and the first-second vehicular sensor node 500-1,2. These vehicular sensor nodes are positioned a distance d apart. Each magnetic sensor 2 is synchronously used to determine the presence of the first vehicle 6-1. The time it takes for the first vehicle to travel from the first-first vehicular sensor node to the first-second vehicular sensor node is preferably known to a fraction of a millisecond. The vehicle velocity estimate is the ratio of the distance d traveled divided by the time to travel, and is typically accurate to a fraction of a percent.

The access point 1500 may integrate the number of vehicles sensed by a collection of vehicular sensor nodes to estimate availability of parking in a parking facility, or a region of the parking facility. The traffic report 1056 may include the estimated availability. The traffic monitoring network 2500 may present the estimated availability to a vehicle 6 trying to park. The vehicle may be operated by a human operator or directed by an automatic driving system.

This may preferably be implemented by a number of schemes. By way of example, each parking spot may be equipped with a vehicular sensor node 500. The access point 1500 may wirelessly communicate with vehicular sensor nodes throughout all or part of a parking facility, forming its estimated availability accurate to each parking spot. Another example scheme uses a vehicular sensor node in each traffic flow zone 2000 of each entrance and each exit to all or part of the parking facility. The estimated availability is then preferably accurate about the number of parking slots available, but not their exact location.

The access point 1500 preferably includes a network transceiver 1060, which may have several preferred embodiments. The network transceiver may include only a network transmitter. Alternatively the network transceiver may include the network transmitter and a network receiver.

The traffic monitoring network 2500 may include a Nema traffic control cabinet. The Nema traffic control cabinet may include a type 170 controller. Alternatively, the Nema traffic control cabinet may include a type 2070 controller. The network transmitter may interface to a relay drive contact, preferably through an opto-isolation circuit. The Nema traffic control cabinet may preferably employ an interface printed circuit board, which may support two relay drive contacts.

In FIG. 5B, the access point 1500 may receive the vehicle sensed state 50 of the four vehicular sensor nodes. To drive a traffic light controlled through the traffic monitoring network 2500, the Nema cabinet may preferably use two signals generated by the network transmitter of the access point to signal the presence of vehicles in each of the two traffic flow zones. The traffic flow zones may correspond to lanes on a roadway. The vehicle sensed state 50 of the first-first vehicular sensor node 500-1,1 may be logically combined with the vehicle sensed state 50 of the first-second vehicular sensor node 500-1,2 to create a single bit of the traffic report 1056. The traffic report may include one bit for the first traffic flow zone 2000-1 and one bit for the second traffic flow zone 2000-2. It may be preferred that a '1' signal the presence of a vehicle, and a '0' signal the presence of no vehicles. In such a situation, the logical combining of the vehicle states may preferably be performed by a logical OR operation, which is readily implemented in the second computer 1010.

Alternatively, the traffic monitoring network 2500 may implement another embodiment of the network-coupling 2502. The network-coupling may include a wireline communications protocol. The wireline communications protocol may include at least one of the following: RS-232, RS-485, in particular, a TS-2 application layer on top of the RS-485 network layer. This application layer may support 19,200 to 600,000 bits per second transfer rates. The network-coupling may further include a version of Ethernet, possibly further supporting a version of High level Data Link Control (HDLC).

The second circuit apparatus 1000 may further include a video camera 1066 video-coupled 1064 with the second computer 1010, as shown in FIG. 5A and FIG. 5B. The video camera may be used to identify a vehicle 6 which is speeding. When the second computer calculates the vehicle velocity estimate 1054, if it exceeds a set maximum, the second computer may trigger the operation of the video camera to photograph the license plate 9. The traffic report 1056 may include a version of the photograph, as well as the vehicle velocity estimate and a time-date stamp. The traffic report may be sent to the traffic monitoring network 2500.

Alternatively, the second memory 1030 may include a non-volatile memory component, which may store the traffic report 1056. The non-volatile memory component storing the traffic report may reside in a removable memory device. Alternatively, the second circuit apparatus 1000 may include a socket for a removable memory device. Traffic reports may be collected, by inserting a removable memory device in the socket, and transferring them to the removable memory device.

The video camera 1066 may be used to identify the vehicle 6 entering and/or leaving a parking structure or reserved entry area. Each time the access point 1500 determines the entry or exit of the vehicle in a traffic flow zone 2000, the video camera may be triggered to photograph the license plate 9. With an overall system strobe of once every millisecond, there is a highly probable, perceptible gap between vehicles entering or leaving.

The preceding embodiments provide examples of the invention and are not meant to constrain the scope of the following claims.

What is claimed is:

1. A method of sensing the presence of a vehicle, comprising the steps of:

maintaining a clock count to create a task trigger and a task identifier;

controlling power from a power source delivered to a radio transceiver and a magnetic sensor based upon said task trigger and said task identifier; and operating said radio transceiver and said magnetic sensor based upon said task identifier, when said task trigger is active; and wherein said power source, said radio transceiver, and said magnetic sensor are enclosed in a vehicular sensor node to operate for at least five years without replacement of said power source using said method.

2. The method of claim 1, wherein said power source, said radio transceiver, and said magnetic sensor are enclosed in a vehicular sensor node to operate for at least ten years without replacement of any component of said power source using said method.

3. The method of claim 1, wherein the step controlling said power, further comprises the step of: providing a transceiver power delivered to said radio transceiver when said task trigger is active and said task identifier indicates at least one of a sensor report and a clock-alignment.

4. The method of claim 1, wherein the step controlling said power, further comprises the step of: providing a sensor power delivered to said magnetic sensor when said task trigger is active and said task identifier indicates a sensor reading.

5. The method of claim 1, wherein the step of controlling said power further comprises the steps of:

minimizing said power from said power source delivered to said radio transceiver and said magnetic sensor, when said task trigger is inactive; and distributing said power from said power source delivered to said radio transceiver and said magnetic sensor based upon said task identifier, when said task trigger is active.

6. The method of claim 1, wherein the step of operating comprises the steps of:

using a magnetic sensor state of said magnetic sensor responding to said presence of said vehicle to create a sensed vehicle state, when said task identifier indicates a sensor reading;

sending said vehicle sensed state by said radio transceiver, when said task identifier indicates a sensor report; and receiving a global clock count from said radio transceiver to confirm-update said clock count, when said task identifier indicates a clock-alignment.

7. The method of claim 6, wherein the step of sending, comprises the step of:

sending said vehicle sensed state by said radio transceiver to create a received vehicle state at an access point; and wherein the step of receiving, comprises the step of:

said radio transceiver receiving said global clock count from said access point.

8. A circuit apparatus for sensing said presence of said vehicle implementing the method of claim 1, comprising:

means for maintaining said clock count to create said task trigger and said task identifier;

means for controlling said power from said power source delivered to said radio transceiver and said magnetic sensor based upon said task trigger and said task identifier; and means for operating said radio transceiver and said magnetic sensor based upon said task identifier, when said task trigger is active.

9. The circuit apparatus of claim 8, wherein said power source includes at least one battery.

10. The circuit apparatus of claim 9, wherein said power source further includes at least one solar cell.

11. The circuit apparatus of claim 8, wherein said magnetic sensor has a primary sensing axis for sensing said presence of said vehicle used to create said magnetic sensor state.

12. The circuit apparatus of claim 8, wherein said magnetic sensor uses a form of the magnetic resistive effect to create said magnetic sensor state.

13. The circuit apparatus of claim 12, wherein said magnetic sensor includes an at least two axis magneto-resistive sensor to create said magnetic sensor state.

14. The circuit apparatus of claim 13, wherein said magnetic sensor includes a two axis magneto-resistive sensor to create said magnetic sensor state.

15. The circuit apparatus of claim 14, wherein said magnetic sensor includes a three axis magneto-resistive sensor to create said magnetic sensor state.

16. The circuit apparatus of claim 8, wherein said radio transceiver implements a version of at least one wireless communications protocol.

17. The circuit apparatus of claim 16, wherein said wireless communications protocol includes the IEEE 802.15.4 communications standard.

18. The circuit apparatus of claim 16, wherein said radio transceiver uses at least one channel of said wireless communications protocol.

19. The circuit apparatus of claim 18, wherein said radio transceiver uses a second of said channels of said wireless communications protocol to communicate with a vehicle radio transceiver associated-attached to said vehicle.

20. The circuit apparatus of claim 8, wherein said means for maintaining, comprises: a clock timer controllably coupled to a computer to deliver said task trigger and said task identifier, and communicatively coupled with said computer to communicate said clock count;

wherein said means for controlling, comprises: a power control circuit coupled with said radio transceiver, and coupled with said magnetic sensor to deliver said power;

wherein said means for operating, comprises:

said computer controllably coupled to said power circuit, said radio transceiver, and said magnetic sensor; and said computer accessibly coupled with a memory containing a program system including the program step of:

operating said radio transceiver and said magnetic sensor based upon said task identifier, when said task trigger is active.

21. The circuit apparatus of claim 20, wherein the program system further comprises the program step of: controlling power from said power source delivered to said radio transceiver and said magnetic sensor based upon said task trigger and said task identifier, comprising the program steps of:

minimizing said power from said power source delivered to said radio transceiver and said magnetic sensor, when said task trigger is inactive; and distributing said power from said power source delivered to said radio transceiver and said magnetic sensor based upon said task identifier, when said task trigger is active.

22. The circuit apparatus of claim 21, wherein the program step of distributing is further comprises the steps of:

delivering a transceiver power to said radio transceiver, when said task identifier indicates said radio transceiver is used; and delivering a sensor power to said magnetic sensor, when said task identifier indicates said magnetic sensor is used.

23. The circuit apparatus of claim 20, wherein the program step of operating comprises the program steps of:

using a magnetic sensor state of said magnetic sensor responding to said presence of said vehicle to create a sensed vehicle state, when said task identifier indicates a sensor reading;

sending said vehicle sensed state by said radio transceiver, when said task identifier indicates a sensor report; and receiving a global clock count from said radio transceiver to confirm-update said clock count, when said task identifier indicates a clock-alignment.

24. The circuit apparatus of claim 8, further comprising at least one of:

a light emitting structure visibly arranged perpendicular to a primary sensing axis of said magnetic sensor; and a second of said light emitting structures visibly arranged parallel to said primary sensing axis for communicating with a vehicle operator.

25. The circuit apparatus of claim 24, wherein said means for controlling further comprises: means for controlling said power from said power source delivered to at least one said light emitting structure and said second light emitting structure based upon said task trigger and said task identifier.

26. The circuit apparatus of claim 25, wherein said means for operating further comprises:

means for visibly communicating with said light emitting structure when said task trigger is active and when said task identifier indicates a feedback task using said light emitting structure; and wherein said means for controlling, comprises:

means for visibly signaling with said second light emitting structure when said task trigger is active and when said task identifier indicates communicating with said vehicle operator.

27. The circuit apparatus of claim 26, wherein said means for visibly communicating with said light emitting structure, further comprises:

means for receiving a probe node address from said radio transceiver; and means for visibly communicating with said light emitting structure using said probe node address; and wherein said means for means for visibly signaling with said second light emitting structure, further comprises:

means for visibly signaling with said second light emitting structure when said task trigger is active and when said task identifier indicates communicating with said vehicle operator for a pedestrian.

28. The circuit apparatus of claim 27, where said means for visibly communicating using said probe node address, further comprises at least one of:

means for visibly communicating when a node address equals said probe node address;

means for visibly communicating when said node address does not equal said probe node address;

means for visibly communicating when said node address is less than said probe node address; and means for visibly communicating when said node address is greater than said probe node address.

29. The circuit apparatus of claim 8, wherein the means for operating, comprises:

means for using said magnetic sensor state of said magnetic sensor responding to said presence of said vehicle to create said sensed vehicle state, when said task identifier indicates said sensor reading;

means for sending said vehicle sensed state by said radio transceiver, when said task identifier indicates said sensor report; and means for receiving said global clock count from said radio transceiver to confirm-update said clock count, when said task identifier indicates said clock-alignment.

30. The circuit apparatus of claim 8, wherein at least one of said means for maintaining, said means for controlling, and said means for operating, comprises at least one of a finite state machine, a field programmable logic device, and a computer.

31. The circuit apparatus of claim 8, wherein a single integrated circuit includes at least two of said means for maintaining, said means for controlling, and said means for operating.

32. The circuit apparatus of claim 31, wherein a single integrated circuit includes each of said means for maintaining, said means for controlling, and said means for operating.

33. The circuit apparatus of claim 31, wherein said single integrated circuit includes at least one of said magnetic sensor and said radio transceiver.

34. The circuit apparatus of claim 8, further comprising an antenna coupled with said radio transceiver.

35. The circuit apparatus of claim 34, wherein said antenna is a patch antenna.

36. A filled shell for said vehicular sensor node, comprising said circuit apparatus of claim 34 enclosed in a plastic shell, said plastic shell filled with a filler.

37. Said vehicular sensor node of claim 36, comprising said filled shell glued to said pavement.

38. A method of making said vehicular sensor node of claim 8, comprising the steps of:

enclosing said circuit apparatus in a plastic shell filled with a filler to create a filled shell; and gluing said filled shell to a locally flat surface to create said vehicular sensor node.

39. The vehicular sensor node and said filled shell, as products of the process of claim 38.

* * * * *